(12) United States Patent
Shimizu

(10) Patent No.: US 7,796,478 B2
(45) Date of Patent: Sep. 14, 2010

(54) OPTICAL DISK APPARATUS

(75) Inventor: Shinya Shimizu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 498 days.

(21) Appl. No.: 11/987,356

(22) Filed: Nov. 29, 2007

(65) Prior Publication Data

US 2008/0134226 A1  Jun. 5, 2008

(30) Foreign Application Priority Data

Dec. 4, 2006  (JP) .............................. 2006-326897

(51) Int. Cl.
*G11B 7/00* (2006.01)
(52) U.S. Cl. ................. 369/44.32; 369/53.19
(58) Field of Classification Search .............. 369/44.32, 369/53.19, 112.02
See application file for complete search history.

(56) References Cited

U.S. PATENT DOCUMENTS

| | | | |
|---|---|---|---|
| 5,808,985 A | | 9/1998 | Gerber et al. |
| 6,434,096 B1 * | | 8/2002 | Akagi et al. ............. 369/44.32 |
| 6,963,520 B1 * | | 11/2005 | Park et al. ................ 369/44.11 |
| 2001/0033528 A1 | | 10/2001 | Sano et al. |
| 2001/0055255 A1 * | | 12/2001 | Ma et al. ................. 369/53.19 |
| 2006/0171266 A1 | | 8/2006 | Noda |

FOREIGN PATENT DOCUMENTS

| | | |
|---|---|---|
| EP | 1 310 951 A1 | 5/2003 |
| JP | 61-048138 A | 3/1986 |
| JP | 2000-311369 | 11/2000 |
| JP | 2002-083438 | 3/2002 |
| JP | 2006-196100 | 7/2006 |
| JP | 2006-302355 | 11/2006 |

\* cited by examiner

*Primary Examiner*—Wayne R Young
*Assistant Examiner*—Latanya Bibbins
(74) *Attorney, Agent, or Firm*—Morgan Lewis & Bockius LLP

(57) ABSTRACT

The whole reflection signal and a tracking error signal are detected while an objective lens is being moved in the radial direction of an optical disk, and the temporal difference between a time at which the value of the whole reflection signal becomes a maximum and a time at which the value of the tracking error signal becomes zero is detected in a predetermined time period. In addition, a value which is obtained by dividing the temporal difference by the time period of one cycle of the tracking error signal is acquired as a tilt appearance magnitude. Relational information in which a tilt appearance magnitude and a tilt correction magnitude corresponding to the tilt appearance magnitude are associated is read out, and the relational information read out and the current tilt appearance magnitude detected by a tilt-appearance-magnitude detection circuit are compared, thereby to determine the tilt correction magnitude necessary for a tilt correction. The tilt correction magnitude is notified to a tilt correction circuit, and is used in making the tilt correction.

3 Claims, 9 Drawing Sheets

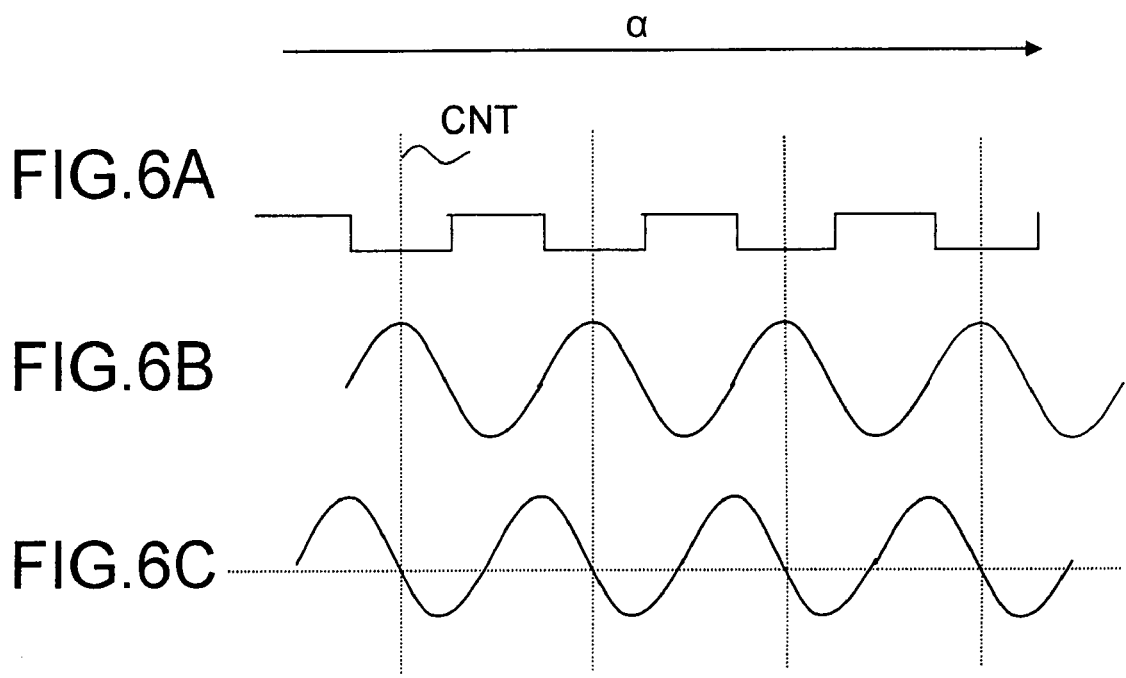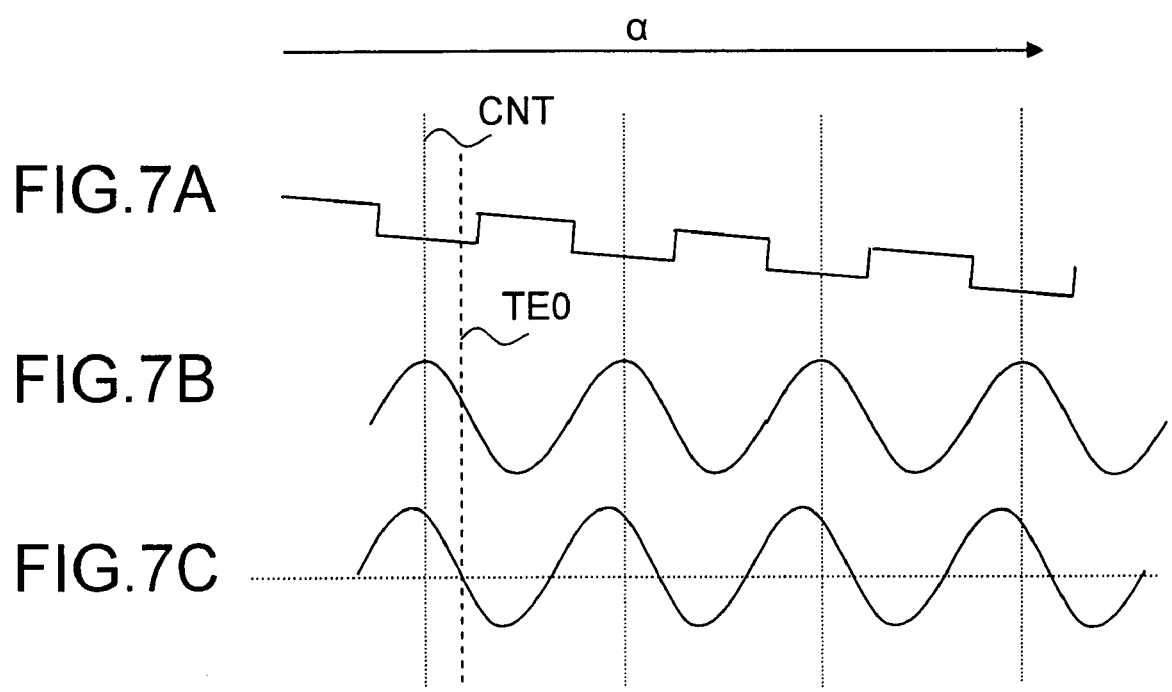

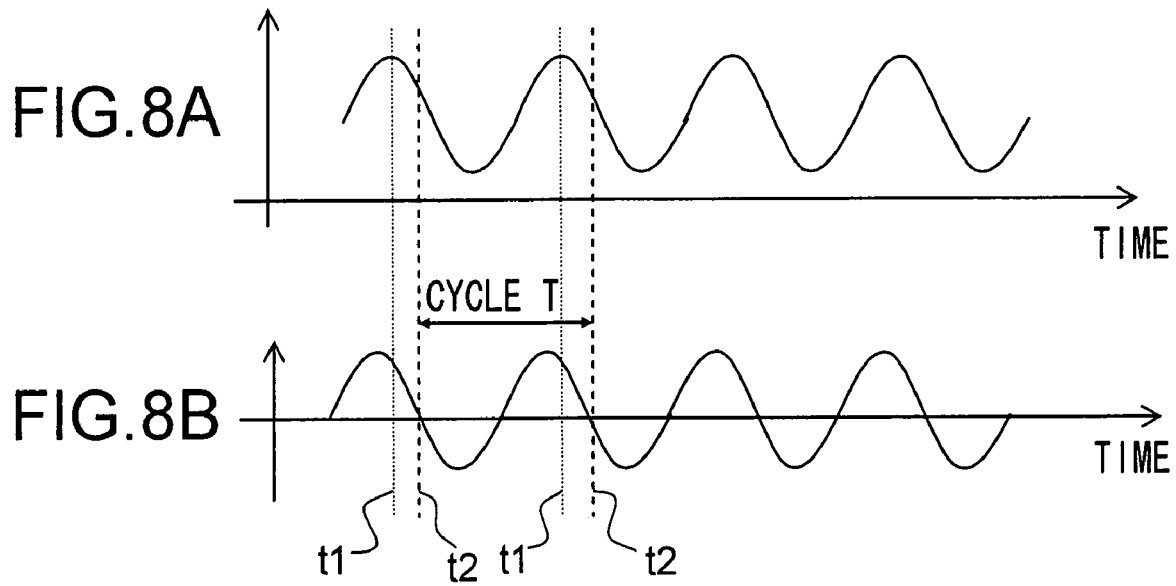
FIG. 8A
FIG. 8B
FIG. 9
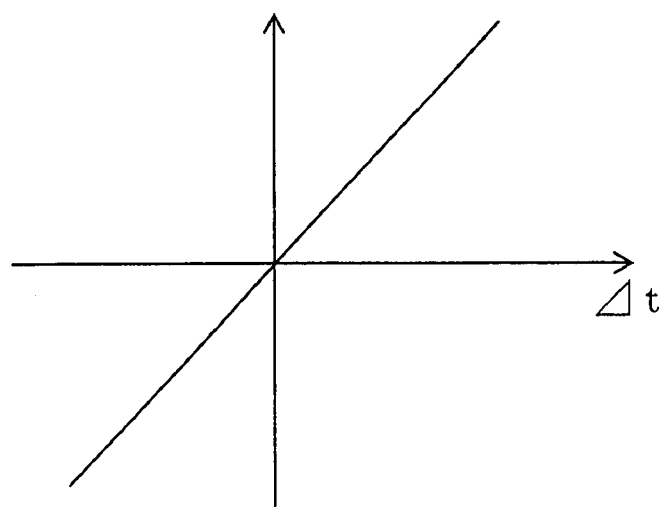

OPTICAL DISK APPARATUS

This application is based on Japanese Patent Application No. 2006-326897 filed on Dec. 4, 2006, the contents of which are hereby incorporated by reference.

BACKGROUND OF THE INVENTION

1. Field of the Invention

The present invention relates to an optical disk apparatus for reading out information recorded on an optical disk, and more particularly to an optical disk apparatus which can correct a coma appearing due to the warp of an optical disk.

2. Description of Related Art

In recent years, optical disks such as a compact disk (hereinbelow, termed "CD") and a digital versatile disk (hereinbelow, termed "DVD") have spread and have come into general use. In addition, an optical disk apparatus exists as an apparatus for reading out and playing back information recorded on an optical disk, for example, vocal information or video information. By way of example, a CD player, a DVD player, or a CD-ROM drive connected to a personal computer is mentioned as an optical disk apparatus which is widely known.

The optical disk apparatus includes an optical pickup device for projecting a light beam onto the optical disk and reading the information. The optical pickup device projects the light beam onto the information record surface of the optical disk which is rotating in a state where it is fixed on a turntable. In addition, reflection light from the optical disk is received by a light receiving element, for example, a photodiode which is disposed in the optical pickup device. Besides, the light is converted into an electric signal by the light receiving element, and the information recorded on the optical disk is outputted on the basis of the electric signal obtained.

For the purpose of accurately reading the information from the optical disk, the information record surface of the optical disk and the focused point of the light beam need to be in agreement at an information read position on the optical disk. Therefore, the distance between the information record surface of the optical disk and an objective lens disposed in the optical pickup device need to be held in a predetermined positional relationship. In order to hold the proper distance, an actuator for driving the objective lens in a vertical or horizontal direction relative to the information record surface is disposed in the optical pickup device. Further, a focus servo mechanism is disposed for driving the actuator in order that the distance between the objective lens and the information record surface may be held constant.

The information record surface of the optical disk sometimes warps on account of various factors. Besides, when the optical disk has been fixed onto the turntable, a part near the outer periphery thereof is sometimes suspended down by its own weight. In a case where the warp or the suspension is slight, the optic axis of the light beam and the information record surface can maintain a substantially perpendicular relationship. Therefore, the information can be read in such a way that the objective lens is driven in the direction vertical to the information record surface, by the above actuator disposed in the optical pickup device.

However, in a case where the warp or suspension of the information record surface is large or where the rotating axis of the disk tilts, the optic axis of the light beam and the information record surface sometimes deviate greatly from the perpendicular relationship therebetween. This incurs the drawback that an information track on the disk as ought to be read cannot be read. In order to eliminate such a drawback, a prior-art optical disk apparatus is provided with a tilt servo mechanism (namely, tilt correction portion which detects the tilt of the optical disk so as to maintain the optic axis of the light beam and the information record surface in the perpendicular relationship therebetween.

By way of example, the tilt servo mechanism adjusts the tilt of an optical pickup or the objective lens on the basis of a tilt appearance magnitude which has been sensed by a tilt sensor assembled in the optical disk apparatus. However, in a case where such a sensor is assembled in the optical disk apparatus anew, there have been the problems that the internal structure of the optical disk apparatus is liable to become complicated, and that the manufacturing cost thereof increases.

In relation to the above problems, Patent Document 1 (JP-A-2000-311369) discloses a tilt correction device which can make a tilt correction immune against an electrical offset and an optical offset, and which can make only the tilt correction independently without being influenced by a detrack correction.

The tilt correction device of Patent Document 1 includes a photosensor which receives light reflected by a light spot, means for obtaining a difference signal of outputs from the photosensor, and tilt control means for controlling the relative tilt between the information medium and a head, with the amplitude of the obtained difference signal as an index, so that the index may approach to an extremum.

Besides, regarding the above problems, Patent Document 2 (JP-A-2002-083438) discloses an optical record/playback apparatus which can detect a detection signal for a tilt correction, without taking any special countermeasure for the optical disk and without employing any special means or component for the drive, and which does not spoil the use sense of a user.

The optical record/playback apparatus of Patent Document 2 includes means for condensing light onto the medium as is provided with a first region having a recess or groove and a second region being flat. Besides, the apparatus applies a focus servo control to the medium by employing a light spot formed by the light condensation means. In the state where the control is applied, the apparatus operates the tilt correction portion so that the difference between the detection level of reflection light in the first region and the detection level of reflection light in the second region, among the detection levels of reflection light from the medium, may become the maximum.

Besides, regarding the above problems, Patent Document 3 (JP-A-2006-196100) discloses a tilt adjustment device which can enhance an approximation precision during the tilt adjustment of the optical pickup, even in a case where the signal levels of a tracking error signal and an RF signal are small and where the differences between the maxima and minima of the amplitudes of the tracking error signal and the RF signal are small.

The tilt adjustment device of Patent Document 3 detects a tilt magnitude which maximizes the amplitude of the tracking error signal, while altering the tilt magnitude of the optical pickup. On this occasion, the tilt magnitude of the optical pickup is altered in a tracking OFF state in a case where the optical disk is an unrecorded disk, and a tracking ON state in a case where the optical disk is a recorded disk. By the way, in the case where the difference between the maximum and minimum of the amplitude of the tracking error signal is small, the signal level of the tracking error signal is amplified to a predetermined signal level, and the tilt magnitude which maximizes the amplitude of the tracking error signal is thereafter detected.

However, tilt adjustment processing which is executed in the devices disclosed in Patent Documents 1-3 has needed to repeat detection processing of comparatively long processing time period (for example, processing for detecting the amplitude of the tracking error signal while the inclination magnitude of the objective lens is being changed) a plurality of times, and to acquire an appropriate tilt correction magnitude in accordance with the results of the detection processing. For this reason, there have been the problems that a time period till the completion of the tilt adjustment processing becomes long, and that the contents of the detection processing are liable to become complicated.

SUMMARY OF THE INVENTION

An object of the present invention is to provide an optical disk apparatus which can acquire an appropriate tilt correction magnitude without adding a tilt sensor or the like device for tilt servo anew, and by easy processing of short time period.

In order to accomplish the object, an optical disk apparatus in the invention consists in an optical disk apparatus including an objective lens which projects a light beam onto a record surface of an optical disk, and which receives reflection light from the optical disk; an actuator which moves the objective lens in a radial direction of the optical disk; a light receiving portion which converts the reflection light reflected from the optical disk, into an electric signal; and a tilt correction portion which corrects a tilt having appeared in the optical disk, on the basis of a reflection signal obtained by converting the received reflection light into the electric signal by the light receiving portion, and a tracking error signal contained in the reflection signal; characterized in that comprising a tilt-appearance-magnitude detection portion which detects the reflection signal and the tracking error signal by the light receiving portion while the objective lens is being moved in the radial direction of the optical disk by employing the actuator, which detects a temporal difference between a time when a value of the reflection signal becomes a maximum and a time when a value of the tracking error signal becomes zero, within a predetermined period, and which detects a value obtained by dividing the temporal difference by a time period of one cycle of the tracking error signal, as a tilt appearance magnitude; a relational-information record portion which records therein relational information that indicates a relationship between a tilt appearance magnitude and a tilt correction magnitude required for the tilt correction portion to decrease the tilt appearance magnitude; and a correction-magnitude instruction portion which reads out the relational information from the relational-information record portion, which determines a tilt correction magnitude on the basis of the relational information and the tilt appearance magnitude detected by the tilt-appearance-magnitude detection portion, and which gives the determined tilt correction magnitude to the tilt correction portion; the tilt correction portion correcting the tilt having appeared in the optical disk, on the basis of the tilt correction magnitude given from the correction-magnitude instruction portion.

According to this configuration, the optical disk apparatus in the invention includes the objective lens, the actuator which moves the objective lens in the radial direction of the optical disk, and a photodetector (namely, the light receiving portion) which performs the photoelectric conversion. The photodetector outputs the reflection signal which is a signal obtained by photoelectrically converting all lights received from the whole light reception region, and the tracking error signal which is obtained by employing a plurality of divided light reception regions. A tilt correction circuit (namely, the tilt correction portion) performs various controls by using both the signals.

Further, according to this configuration, a tilt-appearance-magnitude detection circuit (namely, the tilt-appearance-magnitude detection portion) comprised in the optical disk apparatus in the invention detects the whole reflection signal and the tracking error signal while the objective lens is being moved in the radial direction of the optical disk, at a predetermined timing, for example, in a case where the spinup process of the optical disk has been started. In addition, the tilt-appearance-magnitude detection circuit detects the temporal difference between the time at which the value of the reflection signal becomes the maximum and the time at which the value of the tracking error signal becomes zero. Besides, the tilt-appearance-magnitude detection circuit acquires the value obtained by dividing the temporal difference by the time period of one cycle of the tracking error signal, as the tilt appearance magnitude.

Still further, according to this configuration, the optical disk apparatus in the invention records the relational information in which the tilt appearance magnitude and the tilt correction magnitude necessary for decreasing the tilt appearance magnitude are associated, in a record medium such as ROM (namely, the relational-information record portion) beforehand. A correction-magnitude instruction circuit (namely, the correction-magnitude instruction portion) reads out the relational information, it compares the relational information read out and the current tilt appearance magnitude detected by the tilt-appearance-magnitude detection circuit, and it determines the necessary tilt correction magnitude. The determined tilt correction magnitude is given to the tilt correction circuit, and it is used when the tilt correction circuit makes the tilt correction.

Yet further, the optical disk apparatus in the invention is characterized in that the actuator includes an inclination and movement mechanism which changes the radial inclination angle of the objective lens, and that the tilt correction portion determines the level of a drive signal for the actuator on the basis of the tilt correction magnitude given from the correction-magnitude instruction portion, so as to incline and move the objective lens.

According to this configuration, in the optical disk apparatus in the invention, the actuator has the inclination and movement function of changing the radial inclination angle of the objective lens. In addition, the tilt correction portion determines the magnitude of the drive signal for instructing the actuator to incline and move the objective lens, in accordance with the tilt correction, thereby to make the tilt correction.

Besides, the optical disk apparatus in the invention is characterized in that comprising a liquid crystal device which corrects an aberration; the tilt correction portion determines a voltage to be applied across electrodes included in the liquid crystal device, on the basis of the tilt correction magnitude given from the correction-magnitude instruction portion, so as to correct the aberration.

According to this configuration, the optical disk apparatus in the invention comprises the liquid crystal device for correcting a coma (namely, the aberration) ascribable to the tilt of the optical disk. In addition, the tilt correction circuit determines the magnitude of the voltage to be applied across the electrodes included in the liquid crystal device, in accordance with the tilt correction magnitude, so as to decrease the coma, thereby to correct the tilt.

BRIEF DESCRIPTION OF THE DRAWINGS

FIG. 6A is a model diagram showing the record surface of an optical disk when any tilt does not appear;

FIG. 6B is a model diagram showing the whole reflection signal which is acquired from the record surface of an optical disk when any tilt does not appear;

FIG. 6C is a model diagram showing a TE signal which is acquired from the record surface of an optical disk when any tilt does not appear;

FIG. 7A is a model diagram showing the record surface of the optical disk when a tilt appears;

FIG. 7B is a model diagram showing the whole reflection signal which is acquired from the record surface of the optical disk when a tilt appears;

FIG. 7C is a model diagram showing the a TE signal which is acquired from the record surface of the optical disk when a tilt appears;

FIG. 8A is a model diagram showing the variations with the lapse of time, of the whole reflection signal which is acquired from the record surface of the optical disk when the tilt appears;

FIG. 8B is a model diagram showing the variations with the lapse of time, of the the TE signal which are acquired from the record surface of the optical disk when the tilt appears;

FIG. 9 is a graph graphically showing relational information which is employed in the tilt correction process in the invention;

DESCRIPTION OF THE PREFERRED EMBODIMENTS

Now, embodiments of the present invention will be described with reference to the drawings. Incidentally, the embodiments illustrated here are mere examples, and the invention shall not be restricted to these embodiments.

Figure 1:
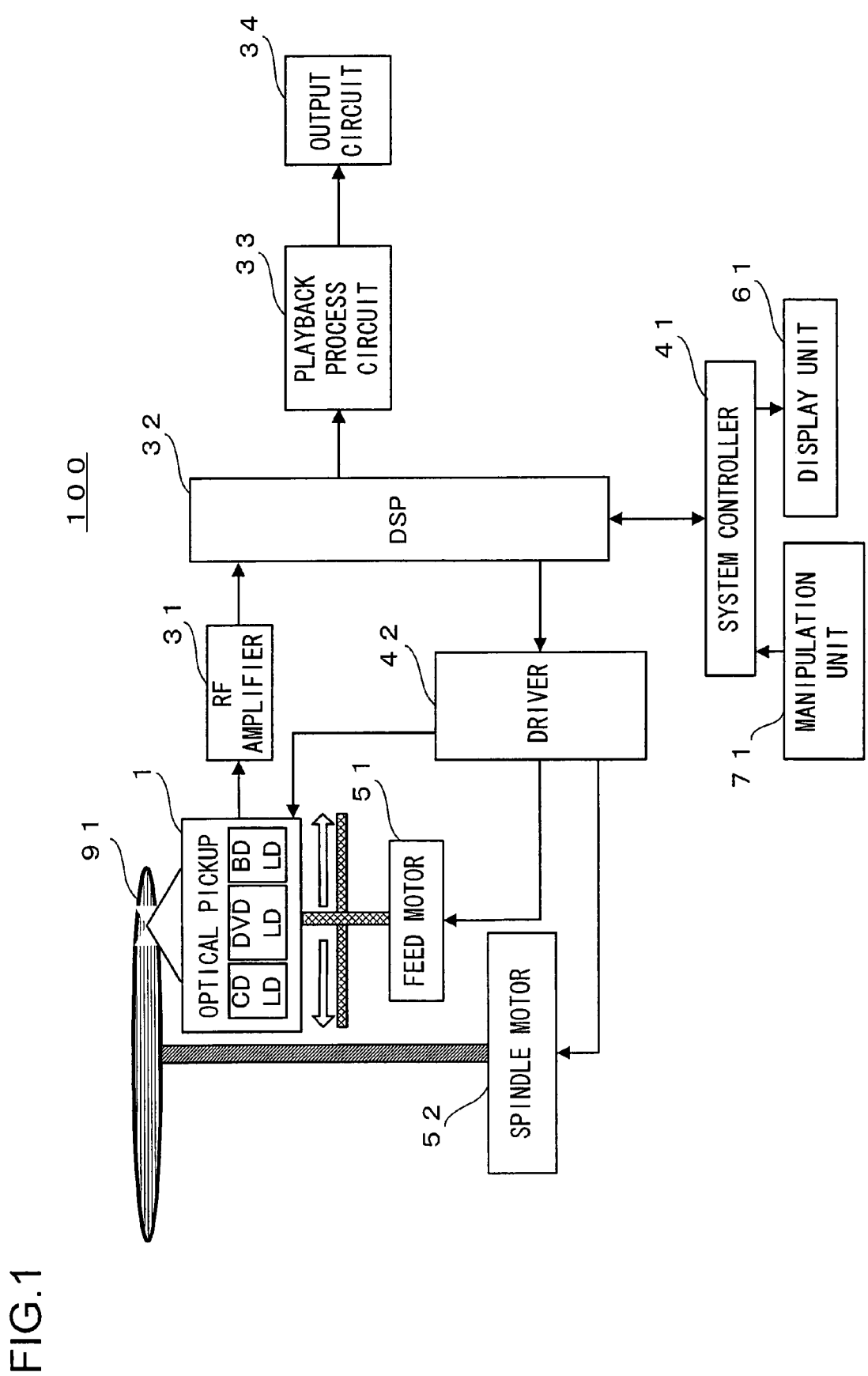
FIG. 1 is a block diagram showing an optical disk apparatus in the present invention.

FIG. 1 is a block diagram of a disk player 100 (namely, optical disk apparatus) according to one embodiment of the invention. The disk player 100 includes an optical pickup 1, an RF amplifier 31, a DSP (Digital Signal Processor) 32, a playback process circuit 33, an output circuit 34, a system controller 41, a driver 42, a feed motor 51, a spindle motor 52, a display unit 61 and a manipulation unit 71.

The optical pickup 1 projects a light beam onto an optical disk 91, and it reads various information items, such as vocal information and video information, recorded on the optical disk 91 (CD, DVD or BD). This optical pickup 1 is provided with a laser diode for the CD, a laser diode for the DVD, and a laser diode for the BD.

The RF amplifier 31, DSP (Digital Signal Processor) 32, playback process circuit 33 and output circuit 34 serve to convert the vocal information and the video information or the like obtained from the optical pickup 1, into a voice and an image, and to output the voice and image to a loudspeaker and a monitor, not shown, respectively.

The RF amplifier 31 amplifies a vocal signal and an image signal or the like from the optical pickup 1. The DSP 32 and the playback process circuit 33 subject the signals from the RF amplifier 31, to various information processes for playback (for example, a video process). The output circuit 34 executes a D/A conversion process, etc. in order to output signals from the playback process circuit 33 to the loudspeaker and the monitor, not shown.

The system controller 41 and driver 42 serve to control the operations of the optical pickup 1, feed motor 51 and spindle motor 52 on the basis of an instruction manipulation accepted through the manipulation unit 71. The system controller 41 accepts the information from the manipulation unit 71 and transfers the information to the DSP 32, and it transfers information from the DSP 32, to the display unit 61. The driver 42 controls the operations of the optical pickup 1, feed motor 51 and spindle motor 52 on the basis of instructions from the DSP 32.

The feed motor 51 is driven by the driver 42 which is operated on the basis of the instruction of the DSP 32. Thus, the optical pickup 1 is moved in the radial direction of the optical disk 91. The spindle motor 52 drives the optical disk 91 in the rotational direction thereof by the driver 42. Besides, the driver 42 performs the focus control of an objective lens 17 included in the optical pickup device 1, on the basis of the instruction of the DPS 32.

The manipulation unit 71 serves for a user to give the disk player 100 various instructions such as the playback of the optical disk 91. The display unit 61 displays various information items retained in the disk player 100, to the user by employing a liquid crystal panel or the like.

Figure 2:
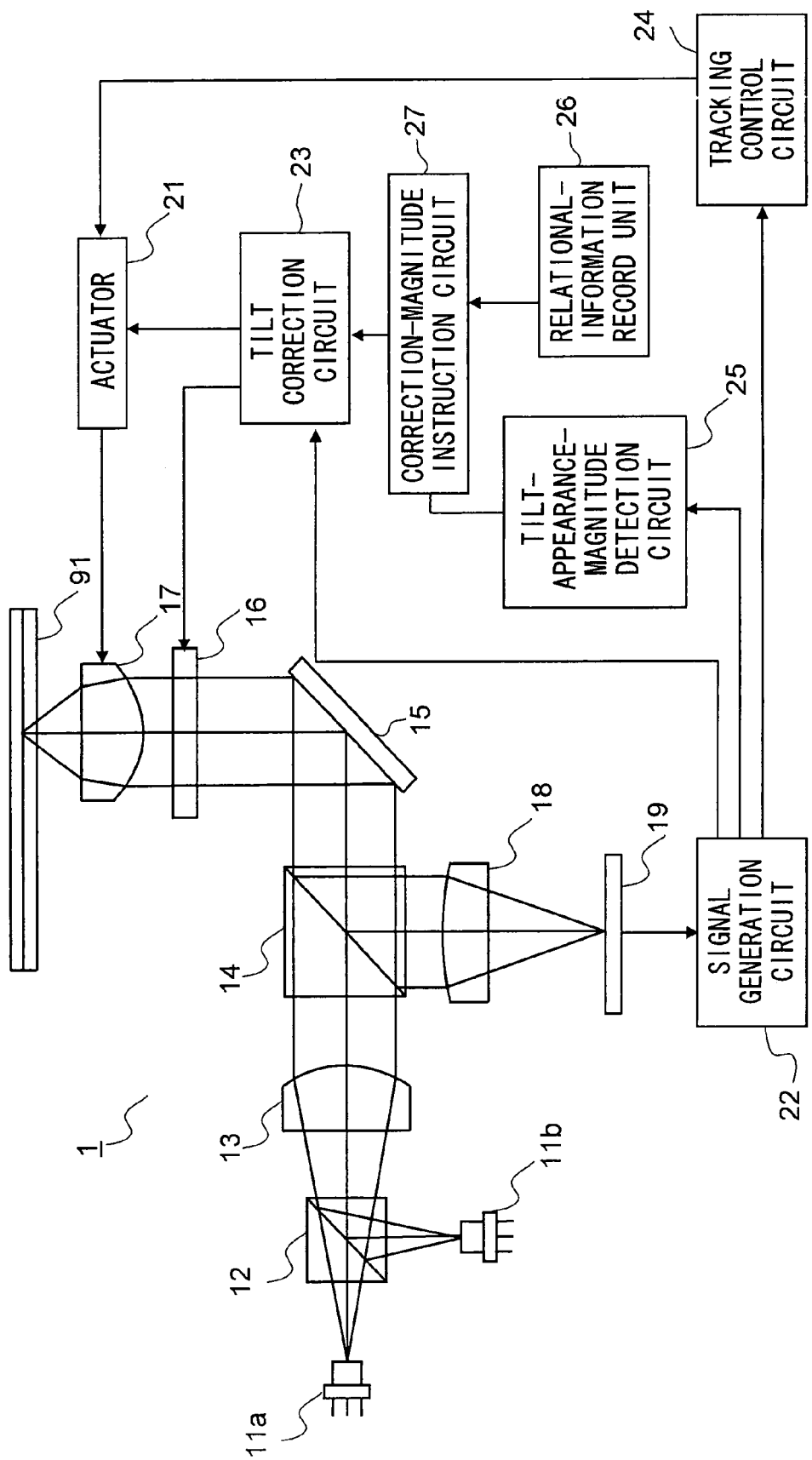
FIG. 2 is a block diagram showing the optical system of an optical pickup device in the invention.

FIG. 2 is a schematic diagram showing the optical system of the optical pickup 1 according to one embodiment of the invention. The optical pickup 1 projects the light beam onto the optical disk 91 such as CD, and receives reflection light. Thus, it is permitted to read the information recorded on the record surface of the optical disk 91. Incidentally, the sorts of the optical disks 91 whose information items can be read by the optical pickup 1 are not limited to the sorts indicated in this embodiment, but they can be variously altered within a range not departing from the scope of the invention.

The optical pickup 1 includes a first light source 11a, a second light source 11b, a dichroic prism 12, a collimate lens 13, a beam splitter 14, a upstand mirror 15, a liquid crystal device 16, the objective lens 17, a detection lens 18, a photodetector 19 (namely, a light receiving portion), an actuator 21, a signal generation circuit 22, a tilt correction circuit 23 (namely, a tilt correction portion), a tracking control circuit 24, a tilt-appearance-magnitude detection circuit 25 (namely, a tilt-appearance-magnitude detection portion), a relational-information record unit 26 (namely, the relational-information record portion), and a correction-magnitude instruction circuit 27 (namely, a correction-magnitude instruction portion). The details of the individual portions constituting the optical pickup 1 will be described below.

The first light source 11a is a semiconductor laser which can emit the light beam of 650 nm band corresponding to the DVD. The second light source 11b is a semiconductor laser which can emit the light beam of 405 nm band corresponding to the BD. By the way, in this embodiment, the semiconductor laser which emits only the light beam of single wavelength is employed as each of the light sources 11a and 11b. However, the invention is not limited to this semiconductor laser, but a semiconductor laser of dual-wavelength unitary type having two light emission points, for example, may well be employed so that light beams of two wavelengths can be emitted.

The dichroic prism 12 transmits therethrough the light beam emitted from the first light source 11a for the DVD, and reflects therefrom the light beam emitted from the second light source 11b for the BD. In addition, the dichroic prism 12 brings into agreement, the optic axes of the light beams emitted from the first light source 11a and the second light source 11b. The light beam transmitted through or reflected from the dichroic prism 12 is conveyed to the collimate lens 13.

The collimate lens 13 converts the light beam passed through the dichroic prism 12, into parallel light. Here, the "parallel light" signifies light in which all the optical paths of the light beams emitted from the first light source 11a and the second light source 11b are substantially parallel to the optic axis of the collimate lens 13. The light beam converted into the parallel light by the collimate lens 13 is conveyed to the beam splitter 14.

The beam splitter 14 functions as a light splitting element which splits the incident light beam, and it transmits therethrough the light beam conveyed from the collimate lens 13, so as to guide the transmitted light beam onto the side of the optical disk 91, while it reflects therefrom the reflection light reflected from the optical disk 91, so as to guide the reflected light onto the side of the photodetector 19. The light beam transmitted through the beam splitter 14 is conveyed to the upstand mirror 15.

The upstand mirror 15 reflects therefrom the light beam transmitted through the beam splitter 14, so as to guide the reflected light beam toward the optical disk 91. This upstand mirror 15 is in a state where it is inclined 45° relative to the optic axis of the light beam from the beam splitter 14, and the optic axis of the light beam reflected from the upstand mirror 15 is substantially orthogonal to the record surface of the optical disk 91. The light beam reflected from the upstand mirror 15 is conveyed to the liquid crystal device 16.

The liquid crystal device 16 controls the change of its refractive index by utilizing the property that liquid crystal molecules change their orientation direction by applying a voltage across a liquid crystal (not shown) sandwiched in between transparent electrodes (not shown). Thus, the phase of the light beam which is transmitted through the liquid crystal device 16 can be controlled. Owing to the arrangement of the liquid crystal device 16, it becomes possible to correct a spherical aberration or coma which is ascribable to the difference of the thickness of a protective layer for protecting the record surface of the optical disk 91, the radial tilt of the optical disk 91, or the like. The light beam passed through the liquid crystal device 16 is conveyed to the objective lens 17.

The objective lens 17 condenses the light beam transmitted through the liquid crystal device 16, onto the record surface of the optical disk 91. Besides, the objective lens 17 is made movable in, for example, up and down directions and right and left directions in FIG. 2, by the actuator 21 to be explained later, and its position is controlled on the basis of a focus servo signal and a tracking servo signal.

By the way, in this embodiment, also the liquid crystal device 16 is mounted on the actuator 21 so as to be movable together with the objective lens 17. However, the liquid crystal device 16 need not always be mounted on the actuator 21, but its configuration is alterable in accordance with the configuration of the optical system.

The reflection light reflected from the optical disk 91 is passed through the objective lens 17 and the liquid crystal device 16 in this order, it is reflected from the upstand mirror 15 and is further reflected from the beam splitter 14, and it is condensed onto a light receiving element disposed on the photodetector 19, by the detection lens 18.

The photodetector 19 converts received light information into an electric signal by employing the light receiving element such as a photodiode. The electric signal obtained by the conversion is conveyed to the signal generation circuit 22 to be explained later, and it is used for generating various signals.

The actuator 21 performs a tracking operation which moves the objective lens 17 in the radial direction of the optical disk 91, in accordance with a lens drive signal generated by and outputted from the driver 42. Here, although not restricted thereto, the actuator 21 may well be one in which a drive current (namely, the lens drive signal) is caused to flow through a coil (not shown) within a magnetic field formed by a permanent magnet (not shown), whereby the objective lens 17 can be driven by a Lorentz force.

Besides, the actuator 21 performs an inclination operation which inclines and moves the objective lens 17 so that the optic axis of the laser beam projected from the objective lens 17 may rock, and a focus operation which moves the objective lens 17 so as to come near to and away from the optical disk 91.

The signal generation circuit 22 receives the output signal of the photodetector 19, and the various signals, for example, the playback signal of data recorded on the record surface of the optical disk 91, the focus servo signal for performing the focus control, and a TE signal (namely, a tracking error signal) for performing a tracking control, are generated from the output signal. The generated signals are respectively outputted to corresponding functional portions.

The tilt correction circuit 23 receives the whole reflection signal (namely, a reflection signal) and the TE signal from the optical disk 91 as have been generated by the signal generation circuit 22, and it determines a tilt correction magnitude on the basis of these signals. In addition, the tilt correction circuit 23 makes a tilt correction by driving the liquid crystal device 16 or the actuator 21 on the basis of the determined tilt correction magnitude.

The tracking control circuit 24 receives the TE signal generated by the signal generation circuit 22, and performs the tracking control of the objective lens 17 on the basis of this signal. Concretely, the tracking control circuit 24 determines the radial position of the objective lens 17 in accordance with the TE signal or a track jump signal received from a seek control circuit (not shown), and it moves the objective lens 17 in the radial direction thereof by employing the actuator 21.

The tilt-appearance-magnitude detection circuit 25 detects the magnitude of tilt appearance from a temporal difference between a time at which the value of the whole reflection signal becomes the maximum and a time at which the value of the TE signal becomes zero, in the case where the optical pickup 1 has moved in the radial direction of the optical disk 91 in a state in which the tracking control is at a stop. Incidentally, the details of a process for detecting the tilt appearance magnitude will be explained later.

The relational-information record unit 26 records therein information (namely, relational information) which indicates the relationship between the tilt appearance magnitude detected by the tilt-appearance-magnitude detection circuit 25 and a correction magnitude (namely, the tilt correction magnitude) necessary for zeroizing the tilt appearance magnitude. Concretely, graphical information which indicates the proportional relationship between the tilt appearance magnitude Δt and the tilt correction magnitude as shown in FIG. 9 is used. Alternatively, it is also allowed to employ an aspect which uses table information recording therein the tilt appearance magnitude and the tilt correction magnitude in association. Incidentally, the information should desirably be created on the basis of, for example, the test results of various tests which are performed for the disk player 100.

The correction-magnitude instruction circuit 27 reads out the relational information from the relational-information record unit 26, and it refers to the relational information read out and the tilt appearance magnitude received from the tilt-appearance-magnitude detection circuit 25. In addition, the correction-magnitude instruction circuit 27 acquires the tilt correction magnitude necessary for zeroizing the tilt appearance magnitude received from the tilt-appearance-magnitude detection circuit 25. The acquired tilt correction magnitude is given to the tilt correction circuit 23. The correction circuit 23 adjusts the inclination of the objective lens 17, or the magnitude of the voltage to be applied to the liquid crystal device 16, on the basis of the given tilt correction magnitude.

Next, the change of the output signal consequent on the movement of the optical pickup 1 in this embodiment will be described with reference to FIGS. 6A, 6B, 6C, 7A, and 7B. FIGS. 6A, 6B, and 6C show the changes of the whole reflection signal and the TE signal which are outputted from the signal generation circuit 22 in a case where the optical pickup 1 has moved from the radial center of the optical disk 91 to the radially outer edge thereof (that is, in a direction indicated by an arrow α), in relation to the information record surface of the optical disk 91. Incidentally, on this occasion, the tracking control by the tracking control circuit 24 is kept stopped.

The "whole reflection signal" is a signal which indicates the change of the summation of all light quantities detected by the photodetector 19. Usually, the whole reflection signal becomes the maximum when the center axis of the objective lens 17 and the center of a track existing on the information record surface of the optical disk 91 are in agreement. Besides, the "TE signal" is a signal which indicates the change of a tracking error appearance magnitude calculated from the difference of received light quantities of individual light reception regions into which the photodetector 19 is divided. Usually, the TE signal becomes zero when the center axis of the objective lens 17 and the center of the track are in agreement. However, this does not hold true in a case where a tilt has appeared in the optical disk 91.

FIG. 6A shows a sectional view of the information record surface of the optical disk 91. FIG. 6B shows the change of the whole reflection signal which is detected from the information record surface in the case where the optical pickup 1 has moved in the direction of the arrow α in the figure. FIG. 6C shows the change of the TE signal which is detected from the information record surface in the case where the optical pickup 1 has moved in the direction of the arrow α in the figure.

Broken lines CNT drawn in common in the individual views indicate the center positions of the individual tracks of the optical disk 91 In FIGS. 6A, 6B, and 6C, the optical disk 91 does not undergo the tilt, and the information record surface at in FIG. 6A is horizontal to the radial direction of the optical disk 91. Accordingly, when the center axis of the objective lens 17 has agreed with the broken lines CNT, that is, the center positions of the individual tracks, the whole reflection signals become the maxima, and the TE signals become zeroes.

FIGS. 7A, 7B, and 7C show the changes of the whole reflection signal (FIG. 7B) and the TE signal (FIG. 7C) in the case where the optical pickup 1 has moved from the radial center of the optical disk 91 to the radially outer edge thereof (that is, in a direction indicated by an arrow α), in relation to the information record surface (FIG. 7A) of the optical disk 91.

In FIG. 7A, the optical disk 91 undergoes the tilt unlike in FIG. 6A, so that the information record surface is not horizontal to the radial direction of the optical disk 91. In this case, the whole reflection signal becomes the maxima when the center axis of the objective lens 17 has agreed with the broken lines CNT, in the same manner as at FIG. 6B. However, the TE signal becomes zeroes at positions different from the broken lines CNT (at a broken line TE 0 existing on the right side of the broken line CNT, in an example at FIG. 7C), unlike at FIG. 6C. In this manner, in the case where the optical disk 91 undergoes the tilt, a deviation appears between the radial position at which the whole reflection signal becomes the maximum and the radial position at which the TE signal becomes zero.

FIGS. 8A and 8B show on the basis of time axes, the changes of the respective signals in the case where the optical pickup 1 has moved from the radial center of the optical disk 91 to the radially outer edge thereof in the state in which the tilt shown in FIG. 7A has appeared and in which the tracking control is at the stop.

FIG. 8A shows on the basis of the time axis, the change of the whole reflection signal which is detected from the information record surface in the case where the optical pickup 1 has moved in the radial direction of the optical disk 91. FIG. 8B shows on the basis of the time axis, the change of the TE signal which is detected from the information record surface in the case where the optical pickup 1 has moved in the radial direction of the optical disk 91. Incidentally, the time axes at FIGS. 8A and 8B are common, so that broken lines, for example, a broken line t1 indicated in common at FIGS. 8A and 8B represent identical times.

In FIGS. 8A and 8B, the broken line t1 indicates the time at which the whole reflection signal becomes the maximum, that is, the time at which the center axis of the objective lens 17 passes through the position of the broken line CNT in FIG. 7A. A broken line t2 indicates the time at which the TE signal becomes zero, that is, the time at which the center axis of the objective lens 17 passes through the position of the broken line TE O in FIG. 7A. Besides, a cycle T indicates the length of the time period of one cycle in which the TE signal changes. In the example shown in FIGS. 8A and 8B, the tilt shown at FIG. 7A has appeared in the information record surface, so that the broken lines t1 and t2 are not in agreement.

Next, a tilt correction process in a prior-art disk player 100 will be described with reference to the block diagrams of FIGS. 1 and 2 and flow charts of FIGS. 10 and 11. Here, a spinup process and a seek process will be exemplified as processes which the tilt correction process in the prior art generates.

Figure 10:
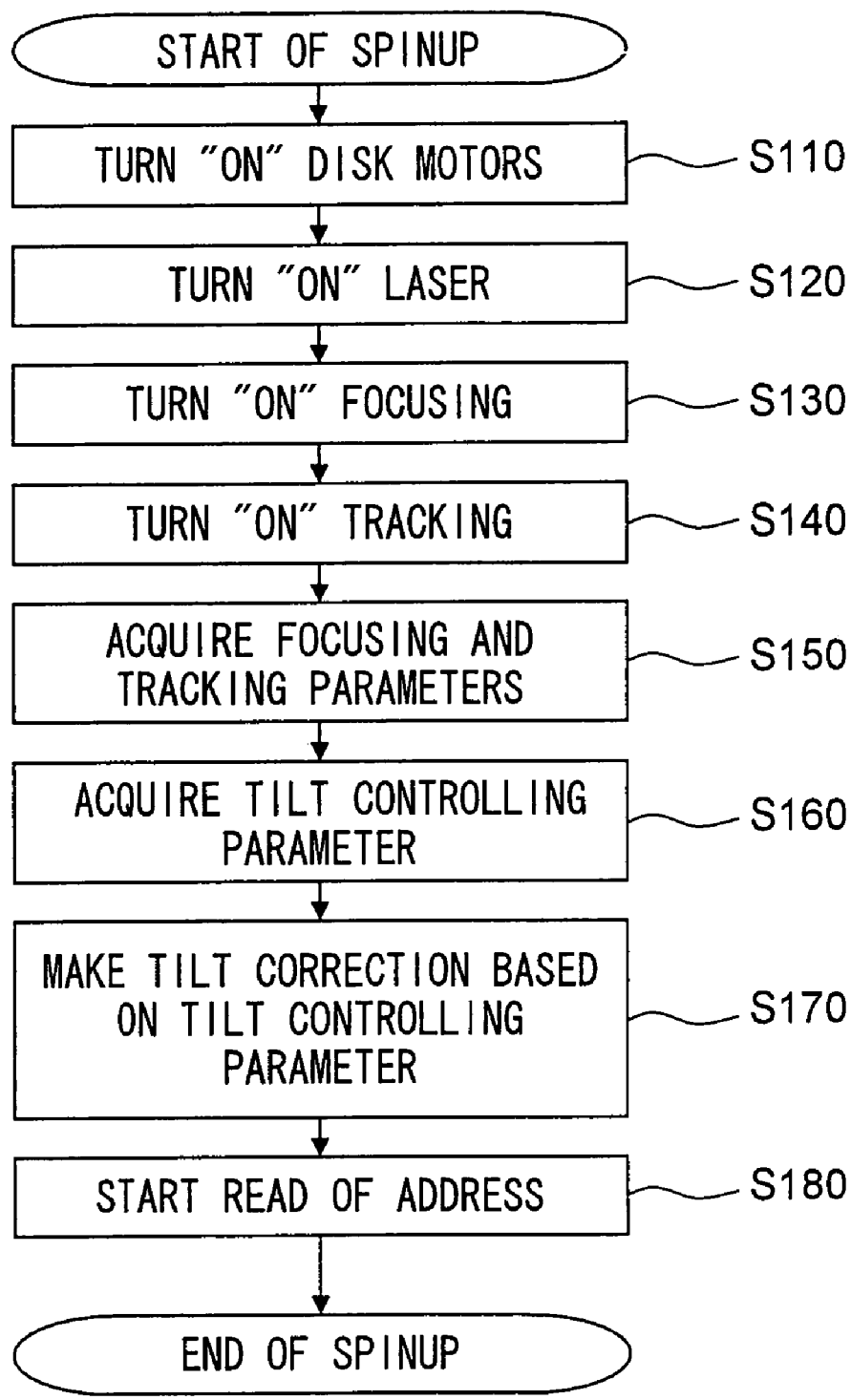
FIG. 10 is a flow chart showing the processing flow of the spinup process of a prior-art optical disk apparatus.

FIG. 10 is the flow chart showing a processing flow in the case where the prior-art disk player 100 executes the spinup process for the optical disk 91. The "spinup process" is a process for bringing the optical disk 91 into a state where it permits a disk access such as read or write.

The spinup process is started, for example, when the system controller 41 has sensed the insertion of the optical disk 91 into the disk player 100. The system controller 41 having sensed the insertion of the optical disk 91 activates the feed motor 51 and the spindle motor 52 at a step S110.

At the next step S120, the first light source 11a or second light source 11b of the optical pickup 1 starts the projection of the light beam for the optical disk 91. The photodetector 19 photoelectrically converts the resulting reflection light, and the signal thus obtained is conveyed to the RF amplifier 31 and the DSP 32. The feed motor 51 starts the focus control at a step S130 on the basis of this signal. Besides, the tracking control circuit 24 and the feed motor 51 start the tracking control at a step S140 on the basis of this signal.

When the focus control and the tracking control have been started, processing for acquiring controlling parameters for use in both the control processing is executed at a step S150. In, for example, the tracking control, the controlling parameter for determining the radial position of the optical pickup 1 is acquired on the basis of the TE signal outputted from the signal generation circuit 22.

Subsequently, processing for acquiring the tilt correction magnitude is executed at a step S160. This processing is carried out in such a way that the tilt correction circuit 23 detects the whole reflection signal and the TE signal outputted from the signal generation circuit 22, while the inclination angle of the objective lens 17 is being changed within a predetermined range or while the voltage to be applied to the liquid crystal device 16 is being changed.

The tilt correction circuit 23 acquires the tilt correction magnitude on the basis of the inclination angle of the objective lens 17 or the applied voltage of the liquid crystal device 16 at the time when a playback signal contained in the whole reflection signal becomes the optimum. The acquired tilt correction magnitude is temporarily recorded in a memory the like. Incidentally, such processing as acquiring the tilt correction magnitudes repeatedly a plurality of times, and taking the average of the acquired tilt correction magnitudes is desirable for enhancing a precision.

Subsequently, at a step S170, the tilt correction circuit 23 makes the tilt correction by controlling the liquid crystal device 16 or the actuator 21 on the basis of the recorded tilt correction magnitude. Subsequently, at a step S180, the optical pickup 1 starts the read of address information from the information record surface of the optical disk 91. Thenceforth, the read of address information is intermittently performed, so that the disk access to the optical disk 91 is permitted. Then, the spinup process is ended.

Figure 11:
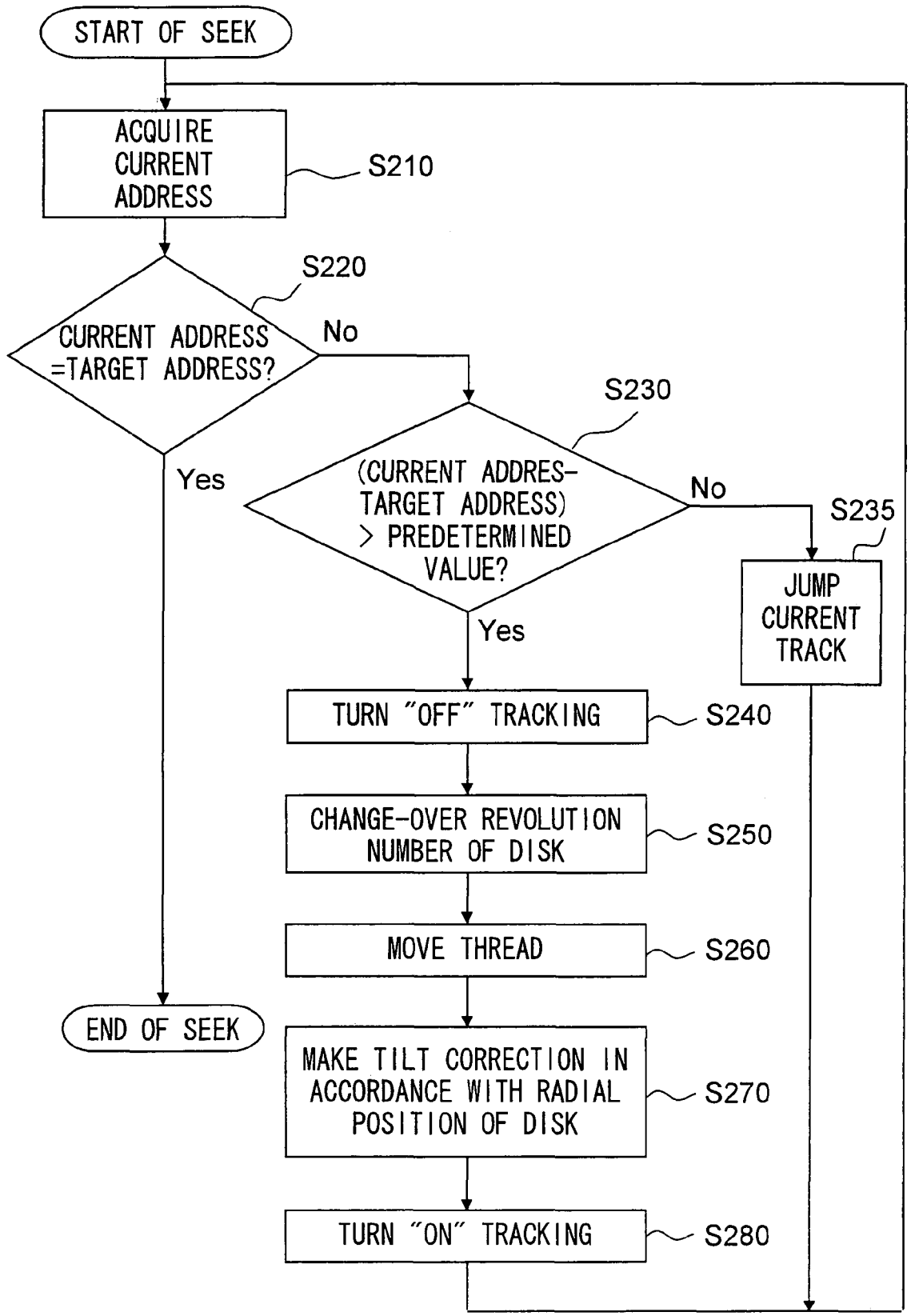
FIG. 11 is a flow chart showing the processing flow of the seek process of the prior-art optical disk apparatus.

FIG. 11 is the flow chart showing a processing flow in the case where the prior-art disk player 100 performs the seek process for the optical disk 91. The seek process is started, for example, when the system controller 41 has sensed a playback process instruction for reading specified information from the optical disk 91. In the case where the seek process has been started, the system controller 41 first acquires the address information of a current track (namely, the current address) onto which the optical pickup 1 is projecting the light beam, at a step S210. In addition, at a step S220, the system controller 41 decides if the current address and an instructed address (namely, a target address) agree.

In case of agreement, the seek process need not be executed, and hence, this process is ended. In case of disagreement, the system controller 41 decides if the difference between the target address and the current address exceeds a predetermined value set beforehand, at a step S230. Incidentally, regarding the practicable value of the predetermined value, it is possible to mention, for example, a method in which the address difference is converted into the number of tracks, and the predetermined value of the address difference is set at about 100 in terms of the number of tracks.

In a case where the predetermined value is not exceeded, the current track is jumped in order to execute the seek process of short distance, at a step S235. In the seek process of short distance, the tilt correction process need not be executed anew, so that the processing flow shifts to the step S210 again after the track jump. In addition, the distance between the current address and the target address is checked again.

To the contrary, in a case where the predetermined value is exceeded at the step S230, the seek process of long distance is started. In a case where the seek process of long distance is executed, the tilt correction process needs to be executed anew. Therefore, the tracking control by the tracking control circuit 24 is first stopped at a step S240. Subsequently, the system controller 41 changes-over the revolution number of the optical disk 91 at a step S250, it moves the thread of the optical pickup 1 at a step S260, and it executes the tilt correction process in accordance with the radial position of the optical disk 91 at a step S270.

Incidentally, the contents of the tilt correction process of the step S270 are the same as the contents of the steps S160 and S170 in FIG. 10, and they shall therefore be omitted from description. After the completion of the tilt correction, the tracking control by the tracking control circuit 24 is started at a step S280. In addition, the processing flow shifts to the step S210 again. Thus, the system controller 41 checks the distance between the current address and the target address again.

Figure 3:
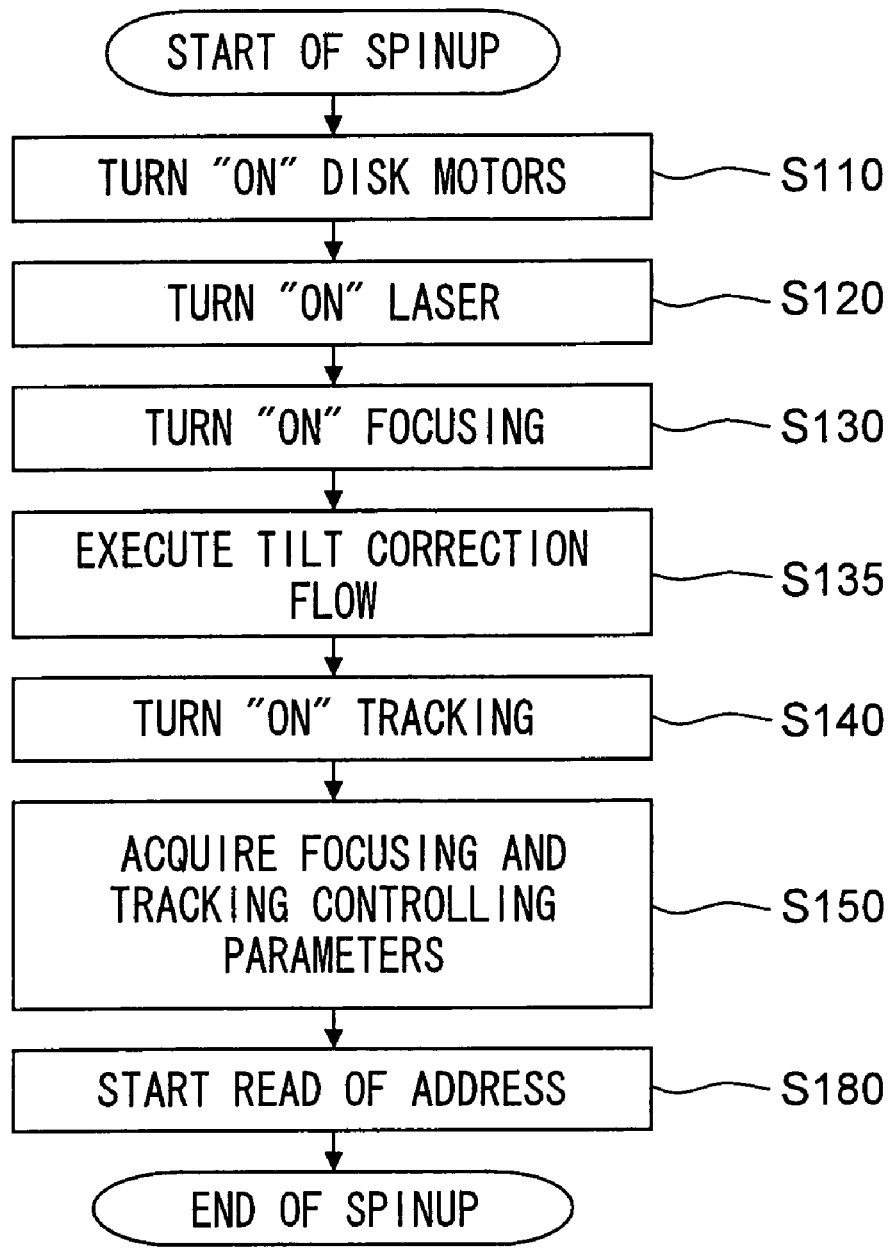
FIG. 3 is a flow chart showing the processing flow of the spinup process of the optical disk apparatus in the invention.

Next, processes which the tilt correction process generates in the disk player 100 according to the embodiment of the invention will be described with reference to the block diagrams of FIGS. 1 and 2 and flow charts of FIGS. 3 and 4. FIG. 3 is the flow chart showing a processing flow in the case where the disk player 100 in the invention performs the spinup process of the optical disk 91. Incidentally, processing steps the contents of which agree with those of the processing steps of the prior-art processing flow are assigned the same step numbers as in FIG. 10.

Steps S110 to S130 execute the same processing as in the prior-art disk player 100, respectively, and they shall therefore be omitted from description. At a step S135 subsequent to the step S130, a tilt correction flow in the invention is executed. Incidentally, the details of the tilt correction flow in the invention will be explained later.

After the execution of the tilt correction flow, the processing of steps S140 and S150 is performed in the same manner as in the prior art. However, the steps S160 and S170 in the prior art become unnecessary owing to the execution of the tilt correction flow at the step S135, and they can be omitted. Lastly, the system controller 41 starts address read processing at a step S180, whereupon this processing flow is ended.

Figure 4:
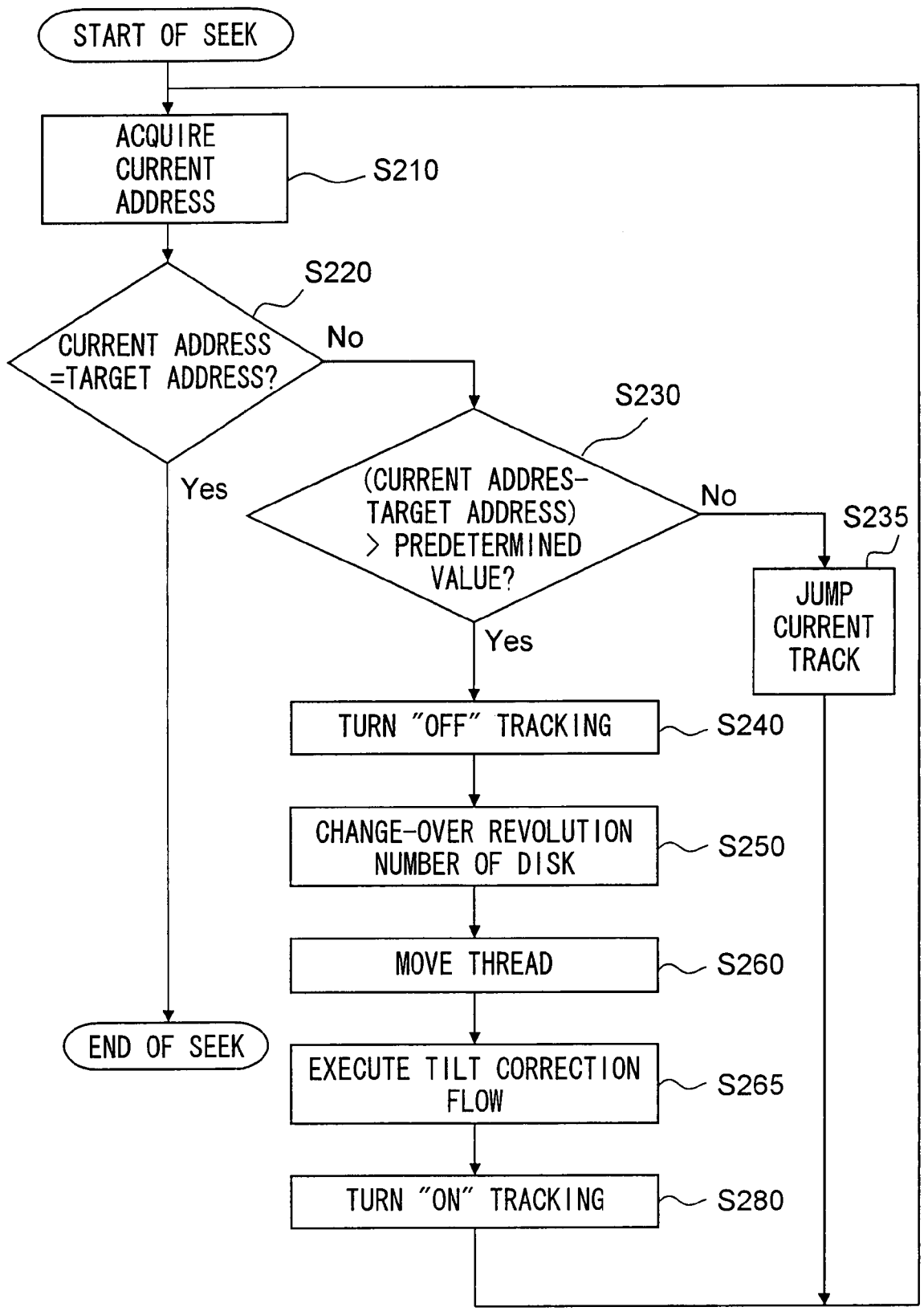
FIG. 4 is a flow chart showing the processing flow of the seek process of the optical disk apparatus in the invention.

FIG. 4 is the flow chart showing a processing flow in the case where the disk player 100 according to the embodiment of the invention performs the seek process for the optical disk 91. Incidentally, processing steps the contents of which agree with those of the processing steps of the prior-art processing flow are assigned the same step numbers as in FIG. 11.

Steps S210 to S260 execute the same processing as in the prior-art disk player 100, respectively, and they shall therefore be omitted from description. In the invention, at a step S265 subsequent to the step S260, the tilt correction flow in the invention is executed. Incidentally, the details of the tilt correction flow will be explained later.

Since the tilt correction flow is executed at the step S265, the step S270 which the prior-art disk player 100 executes becomes unnecessary and can be omitted. Lastly, the tracking control by the tracking control circuit 24 is started at a step S280, whereupon the processing flow shifts to the step S210.

Next, the tilt correction flow of the disk player 100 according to the embodiment of the invention will be described with reference to the block diagrams of FIGS. 1 and 2, a flow chart of FIG. 5 and the model diagram of FIGS. 8A and 8B. Incidentally, this tilt correction flow is a processing flow which shows the contents of the step S135 in FIG. 3 and the step S265 in FIG. 4 in detail. Since the steps S135 and S265 have the same processing contents, they shall be described in conjunction with one flow chart shown in FIG. 5.

Figure 5:
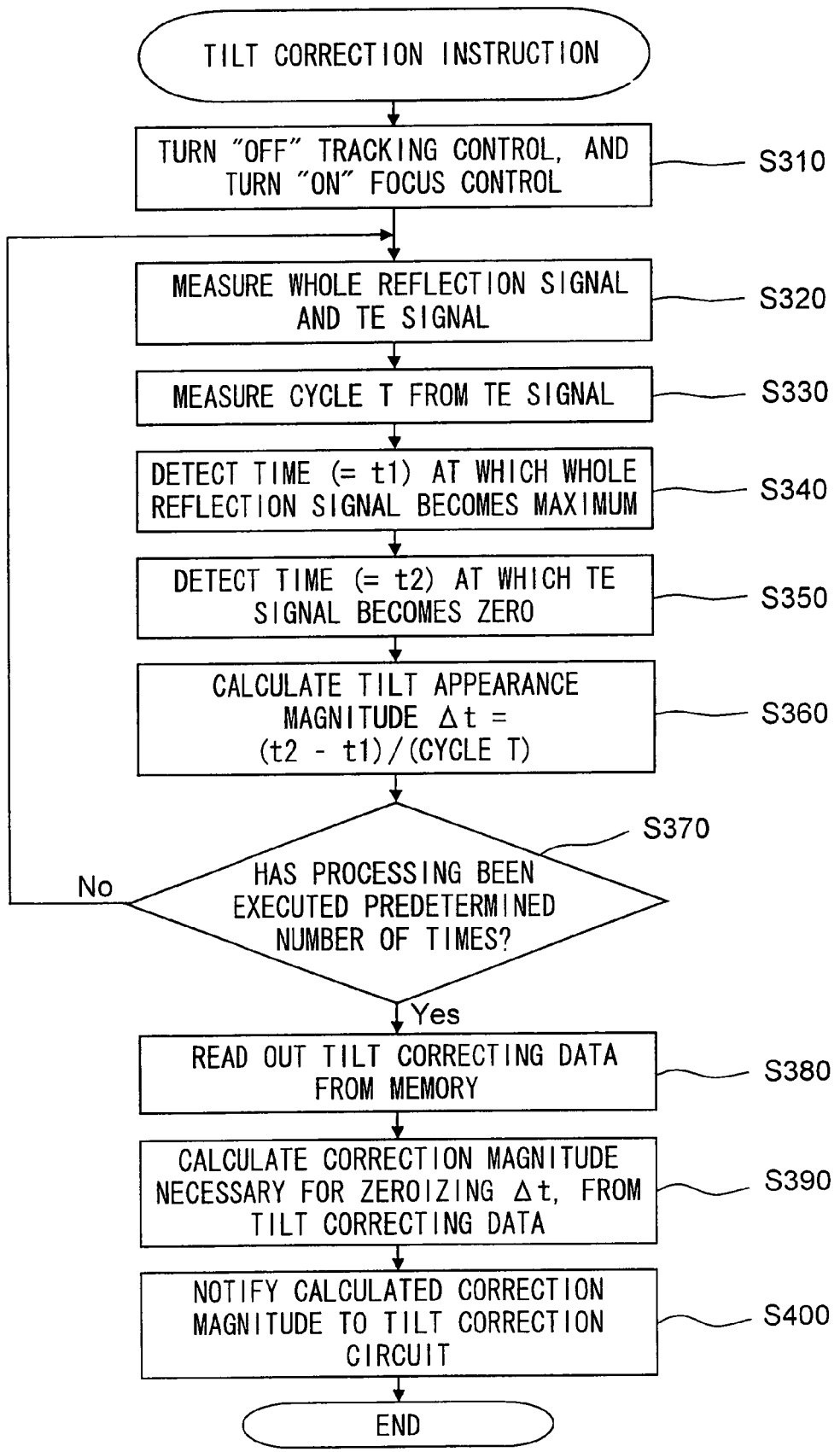
FIG. 5 is a flow chart showing the processing flow of the tilt correction process of the optical disk apparatus in the invention.

The processing flow of FIG. 5 is started in such a way that the start of the tilt correction flow is instructed at the step S135 in FIG. 3 or the step S265 in FIG. 4. First, at a step S310, the system controller 41 checks if the disk player 100 is in a state where the tracking control by the tracking control circuit 24 is stopped and where the focus control by the feed motor 51, etc. is operating. In a case where the above state does not hold true, the stop of the tracking control and/or the start of the focus control are/is performed, thereby to shift the disk player 100 into the above state.

Subsequently, at a step S320, the tilt-appearance-magnitude detection circuit 25 projects the light beam onto the information record surface while the optical pickup 1 is being moved in the radial direction of the optical disk 91 by the feed motor 51. In addition, the measurements of the whole reflection signal and the TE signal are started by employing the photodetector 19 and the signal generation circuit 22.

Subsequently, at a step S330, the tilt-appearance-magnitude detection circuit 25 measures the length of one cycle from the waveform of the TE signal. In the example shown in FIG. 8B, the cycle T at FIG. 8B becomes the length of one cycle of the TE signal.

Subsequently, at a step S340, the tilt-appearance-magnitude detection circuit 25 acquires the time (=t1) at which the value of the whole reflection signal obtained from the signal generation circuit 22 becomes the maximum. In the example shown in FIGS. 8A and 8B, the broken line t1 common to FIGS. 8A and 8B in represents the above time. Incidentally, as shown in FIG. 8B, new times t1 are successively sensed with the lapse of time (rightward as viewed in the figure). Therefore, the tilt-appearance-magnitude detection circuit 25 holds the newest time t1 at all times, and the times t1 detected within a predetermined time period in the past should desirably be recorded in the memory or the like.

Subsequently, at a step S350, the tilt-appearance-magnitude detection circuit 25 acquires the time (=t2) at which the TE signal obtained from the signal generation circuit 22 becomes zero. In the example shown in FIGS. 8A and 8B, the broken line t2 common to FIGS. 8A and 8B represents the above time. Likewise to the times t1, new times t2 are sensed with the lapse of time. Therefore, the tilt-appearance-magnitude detection circuit 25 holds the newest time t2 at all times, and the times t2 detected within a predetermined time period in the past should desirably be recorded in the memory or the like.

Subsequently, at a step S360, the tilt-appearance-magnitude detection circuit 25 calculates the tilt appearance magnitude (=Δt) from the acquired cycle T and times t1 and t2. Concretely, the tilt appearance magnitude Δt is calculated in conformity with the following formula:

$$\Delta t = (t2-t1)/(\text{cycle } T)$$

By the way, in a case where a plurality of times t1 exist for the time t2, the time t1 as to which the absolute value of a temporal difference is small is preferentially used. In the example of FIG. 8B, the broken line t1 lying on the left side of the broken line t2 corresponds to the preferential time t1, and the broken line t1 existing on the right side of the broken line t2 is neglected. The reason therefor is that the broken line t1 on the right side of the broken line t2 represents the time at which the value of the whole reflection signal has become the maximum at a different track.

Subsequently, at a step S370, the tilt-appearance-magnitude detection circuit 25 decides if the processing of the steps S320 to S360 has been executed a predetermined number of times set beforehand. Subject to the decision that the processing has not been executed the predetermined number of times, the processing flow shifts to the step S320, so as to repeat the processing for acquiring the tilt appearance magnitude. To the contrary, subject to the decision that the processing has been executed the predetermined number of times, the processing flow shifts to the subsequent step S380.

Subsequently, at the step S380, the correction-magnitude instruction circuit 27 reads out the tilt correcting data (namely, the relational information) from the record unit such as memory. The tilt correcting data are data which indicate the relationship between the tilt appearance magnitude Δt and the tilt correction magnitude necessary for zeroizing the magnitude Δt (namely, for correcting the tilt), as shown in FIG. 9 by way of example.

The "tilt correction magnitude" indicates, for example, the magnitude of the drive signal level to be given to the actuator 21 in order to change the inclination of the objective lens 17, or the magnitude of the voltage to be applied across the electrodes of the liquid crystal device 16. By the way, in FIG. 9, the graph data are shown as the example of the tilt correcting data, but the tilt correcting data may well be in that format of table data in which the tilt appearance magnitude Δt and the tilt correction magnitude are associated and are indicated in a stable structure.

Subsequently, at a step S390, the correction-magnitude instruction circuit 27 determines the tilt correction magnitude for zeroizing the magnitude Δt acquired at the step S360, by using the tilt correcting data read out. Incidentally, the step S360 stated before is usually executed a plurality of times as the branches of the processing of the step S370. Therefore, the tilt correction magnitude is determined using, for example, the average value of the magnitudes Δt acquired the plurality of number of times. Alternatively, it is also allowed to employ a method in which the tilt correction magnitudes corresponding to all the acquired tilt appearance magnitudes Δt are individually determined, and the average of the plurality of determined tilt correction magnitudes is calculated.

Subsequently, at a step S400, the correction-magnitude instruction circuit 27 gives the tilt correction circuit 23 the tilt correction magnitude acquired at the step S390. Thereafter, the tilt correction circuit 23 makes the tilt correction by using the given tilt correction magnitude. Concretely, by way of example, the drive signal for inclining and moving the objective lens 17 on the basis of the given tilt correction magnitude is transmitted to the actuator 21. Alternatively, the voltage to be applied to the liquid crystal device 16 is controlled on the basis of the tilt correction magnitude, thereby to control the correction magnitude of the coma correction which the liquid crystal device 16 makes. Then, the tilt correction process is ended.

According to the above configuration, the tilt correction magnitude which optimizes a playback signal need not be learnt by changing the tilt correction magnitude a plurality of times as in the prior art, and a processing time period can be shortened. Besides, any device for the tilt correction need not be added anew. Moreover, since the processing time period is short, the tilt correction process can be executed at any desired timing, and it can be executed at, for example, the change of an ambient temperature. Furthermore, the tilt correction can be made using the tilt correction magnitude given from the correction-magnitude instruction circuit, without altering the function of the tilt correction circuit which has hitherto been existent.

Other Embodiments

Although the present invention has thus far been described by mentioning the preferred embodiment, it is not always restricted to the foregoing embodiment, but it can be variously altered and performed within the scope of the technical idea thereof.

Accordingly, the invention is applicable also to the following aspects:

(A) In the foregoing embodiment, the spinup process and the seek process have been exemplified as the processes which the tilt correction flow (FIG. 5) generates, but it is also allowed to employ an aspect in which the tilt correction flow of the invention is performed in a case where the tilt correction has become necessary in any other process.

(B) In the embodiment, in executing the seek process shown in FIG. 4, the tilt correction flow is performed at the step S265 after the movement of the thread at the step S260. In this regard, it is also allowed to employ an aspect in which a certain time period (for example, several ms to several tens ms) is set as a settling time for settling the signals, immediately after the step S260.

(C) In the embodiment, the actuator 21 for inclining and moving the objective lens 17, and the liquid crystal device 16 have been exemplified as subjects for the controls of the tilt correction circuit 23. It is also allowed, however, to employ an aspect in which the tilt correction circuit 23 gives a tilt correction instruction to any other tilt correction device, on the basis of the tilt correction magnitude obtained by the tilt correction flow of the invention.

(D) In the embodiment, the disk player 100 has been exemplified as the optical disk apparatus including the optical pickup 1, but the invention can be performed also in any other optical disk apparatus including the optical pickup 1, for example, an optical disk record apparatus such as a CD-R drive.

(E) The embodiment includes the signal generation circuit 22, tilt correction circuit 23, tracking control circuit 24, tilt-appearance-magnitude detection circuit 25 and correction-magnitude instruction circuit 27 in order to perform the tracking control, but it is also allowed to employ an aspect in which programs having functions equivalent to these plurality of circuits are run on a processing unit such as microprocessor, whereby the tilt correction process of the invention is realized.

What is claimed is:

1. An optical disk apparatus including:
   an objective lens which projects a light beam onto a record surface of an optical disk, and which receives reflection light from the optical disk;
   an actuator which moves the objective lens in a radial direction of the optical disk;
   a light receiving portion which converts the reflection light reflected from the optical disk, into an electric signal; and
   a tilt correction portion which corrects a tilt having appeared in the optical disk, on the basis of a reflection signal obtained by converting the received reflection light into the electric signal by the light receiving portion, and a tracking error signal contained in the reflection signal; comprising:
   a tilt-appearance-magnitude detection portion which detects the reflection signal and the tracking error signal by the light receiving portion while the objective lens is being moved in the radial direction of the optical disk by employing the actuator, which detects a temporal difference between a time when a value of the reflection signal becomes a maximum and a time when a value of the tracking error signal becomes zero, within a predetermined period, and which detects a value obtained by dividing the temporal difference by a time period of one cycle of the tracking error signal, as a tilt appearance magnitude;
   a relational-information record portion which records therein relational information that indicates a relationship between a tilt appearance magnitude and a tilt correction magnitude required for the tilt correction portion to decrease the tilt appearance magnitude; and
   a correction-magnitude instruction portion which reads out the relational information from said relational-information record portion, which determines a tilt correction magnitude on the basis of the relational information and the tilt appearance magnitude detected by said tilt-appearance-magnitude detection portion, and which gives the determined tilt correction magnitude to the tilt correction portion;
   wherein the tilt correction portion corrects the tilt having appeared in the optical disk, on the basis of the tilt correction magnitude given from said correction-magnitude instruction portion.

2. An optical disk apparatus as defined in claim 1, wherein:
   the actuator has an inclination and movement function of changing a radial inclination angle of the objective lens; and
   the tilt correction portion determines a level of a drive signal for the actuator, on the basis of the tilt correction magnitude given from said correction-magnitude instruction portion, so as to incline and move the objective lens.

3. An optical disk apparatus as defined in claim 1 or claim 2, comprising:
   a liquid crystal device which corrects an aberration;
   wherein the tilt correction portion determines a voltage to be applied across electrodes included in said liquid crystal device, on the basis of the tilt correction magnitude given from said correction-magnitude instruction portion, so as to correct the aberration.

* * * * *